T. B. & T. R. JORDAN.
Rock-Drill.
No. 211,022. Patented Dec. 17, 1878.
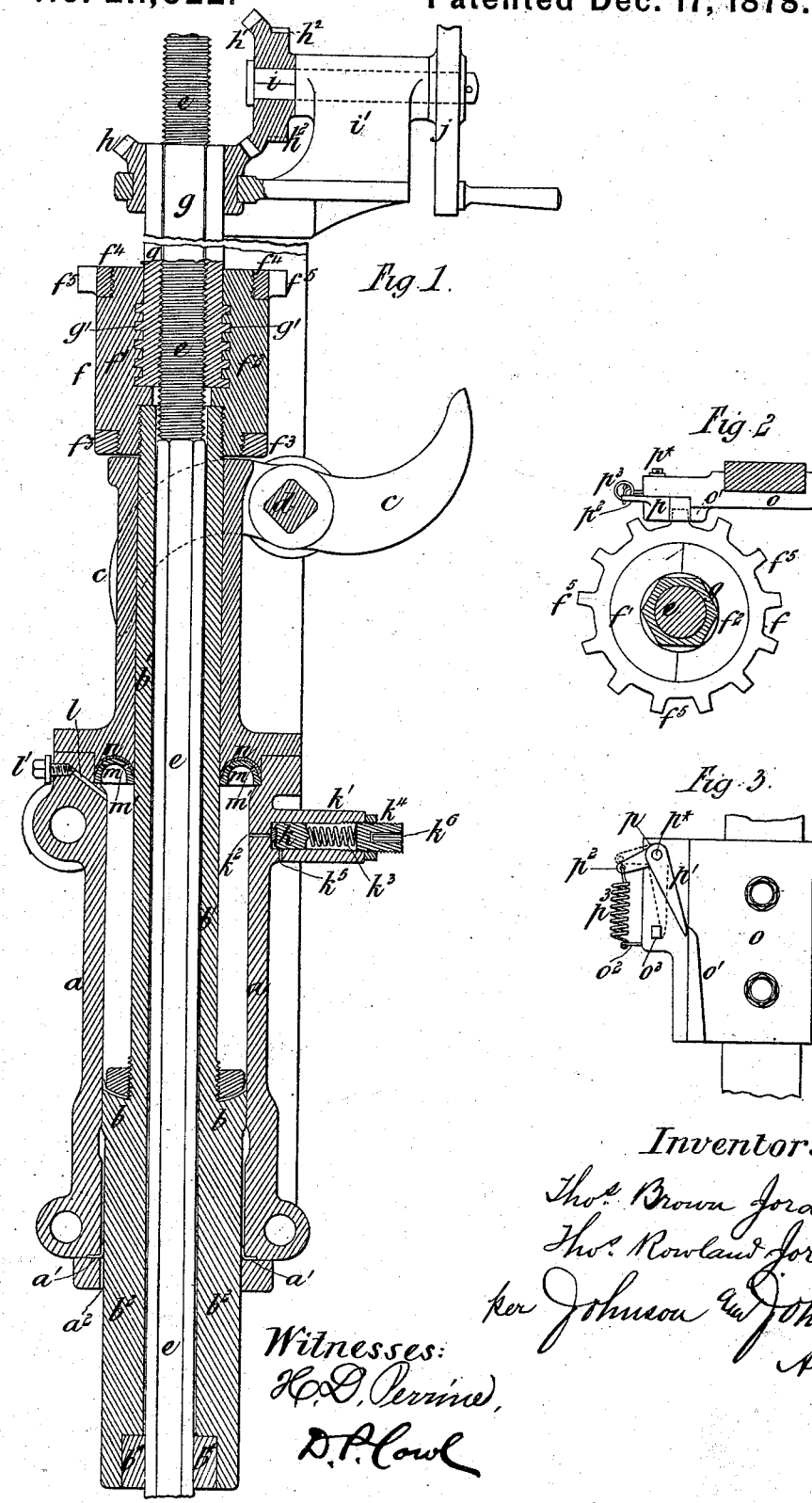
Inventors:
Thos. Brown Jordan
Thos. Rowland Jordan
per Johnson & Johnson
Attys
Witnesses:
H. D. Perrine
D. P. Cowl

UNITED STATES PATENT OFFICE.

THOMAS B. JORDAN AND THOMAS R. JORDAN, OF LONDON, ENGLAND.

IMPROVEMENT IN ROCK-DRILLS.

Specification forming part of Letters Patent No. 211,022, dated December 17, 1878; application filed October 4, 1878; patented in England, June 26, 1878.

*To all whom it may concern:*

Be it known that we, THOMAS BROWN JORDAN and THOMAS ROWLAND JORDAN, both of London, England, engineers, have invented new and useful Improvements in Machines for Drilling or Boring Rocks and other hard substances, of which the following is a specification, reference being had to the accompanying drawing.

This invention is designed to improve the machine for which a patent of the United States was granted to the said Thomas Brown Jordan, and dated the 5th March, 1878, No. 201,017, and the said invention comprises improvements in various parts of the machine, whereby the same is rendered more efficient in its operation.

The said improvements are illustrated in the accompanying drawing, in which Figure 1 is a longitudinal section of my improved machine, and Figs. 2 and 3 show a plan and side elevation of portions of the said machine detached and hereinafter described.

Like letters indicate the same parts in all the figures.

The said machine has a cylinder supported in a suitable frame, and wherein a piston which operates the drill or tool is driven forward by the force of air compressed above or behind the said piston. The raising of the said piston and parts connected therewith is effected by a revolving cam or cams driven by hand or otherwise.

$a$ is the cylinder; $b$, the piston. $b^1$ is the tubular piston-rod. $c\ c$ are cams. $d$ is the cam-shaft; $e$, the drill-bar. $f$ is the lifting-block, which is screwed on the top of the tubular piston-rod $b^1$, and is so constructed as to hold the drill-bar in connection with it by the means hereinafter described. $g$ is the long nut, and $g'$ the collars on the same. $f^1 f^2$ are the two halves of the lifting-block, secured together upon the nut $g$ by the external screwed sleeves $f^3 f^4$. $h$ is the miter-wheel through which the nut $g$ slides, the said nut being of hexagonal form, and likewise the hole in the wheel $h$, so that the nut cannot turn without the said wheel. The drill-bar $e$ slides through the piece $b^*$ in the lower end of the piston-rod, both the bar $e$ and piece $b^*$ being hexagonal in form, thus causing the piston-rod and the said bar to move together.

$h^1$ is the miter-wheel gearing with the wheel $h$, and $i$ is its shaft, supported in the bearing $i'$, the said shaft being provided with the hand-wheel $j$.

In order to prevent the rotation of the nut $g$ with the lifting-block $f$ we employ a ratchet-wheel, $h^2$, which forms a part of or is attached to the miter-wheel $h^1$. In connection with the said ratchet-wheel we arrange a pawl, which, when in gear with the said ratchet-wheel, does not allow of any backward movement of the wheel $h^1$, or any corresponding movement of the wheel $h$, and therefore prevents any rotation of the nut $g$. In case the drill is not fed forward sufficiently by the action of the cams on the lifting-block we effect the necessary feed by means of the hand-wheel $j$, the pawl in connection with the ratchet-wheel riding freely over the teeth of the same.

When it is desired to draw back the drill-bar we disengage the pawl from the said ratchet-wheel, and turn the hand-wheel $j$ in the opposite direction to that required for feeding the said drill-bar forward. This movement of the hand-wheel through the miter-wheels $h^1\ h$ effects the necessary rotation of the nut $g$ for the above purpose.

We have found in practice that it is of great advantage to admit a small additional charge of air into the cylinder of our machine at each downstroke, and we have therefore devised simple and effectual means whereby this object is attained. For this purpose, as shown in Fig. 1 of the drawing, the lower part of the piston-rod is enlarged, as shown at $b^2$, so as to form a trunk of nearly the same diameter as the piston $b$, the said trunk being usually made three-sixteenths of an inch less in diameter than that of the interior of the said cylinder. This trunk passes through a leather collar turned upward, as shown at $a^1$. A number of grooves, one of which is shown at $a^2$, are cut in the gland-cover and through the neck of the gland to admit a free passage of air during the upstroke of the piston $b$, which air cannot return through the said grooves during the downstroke, as its pressure closes the leather collar $a^1$ against the trunk $b^2$ and the said collar, acting as a stop-valve, so that the air contained in the annular space between the trunk $b^2$ and the interior of the cylinder above the collar $a^1$ must at every downstroke pass the piston $b$ and enter the space above the latter, thereby increasing the quantity of air in that space.

In order that the air-pressure may not thereby become greater than is required, and so overcome the power of the men at the handles, or other power employed for raising the piston and pawls connected therewith, we provide an escape-valve, $k$, placed in a cylinder or casing, $k^1$, which forms a part of or is attached to the upper part of the cylinder $a$. This escape-valve is preferably provided with a piece of leather or other similar material at its inner end, arranged to close the aperture $k^2$ in the cylinder $a$, the said valve being forced to close such aperture by the pressure of a spring, $k^3$, as shown, the force of the said spring being regulated by the screw $k^4$, so as to relieve the cylinder at any desired pressure, according to the power to be used for raising the piston. The air from the cylinder $a$, when the same overcomes the resistance of the spring $k^3$, passes out through the aperture $k^5$. We propose to turn the screw $k^4$ for regulating the pressure of the spring by means of a separate key fitting an aperture, $k^6$, in a tube inserted in the said screw. Providing a detached key, as described, affords means whereby the regulation of this valve may be under the control of one responsible person, and not be left to the men who work the handles for raising the piston.

In the upper portion of the cylinder $a$ we form a small passage or opening, $l$, communicating with a tapped hole which is designed to receive a suitable pressure-gage, which we may in some cases attach to the said cylinder to denote the pressure of air within the same. This opening is closed when the said pressure-gage is not employed by a screw, $l'$, as shown.

We have shown in the upper end of the cylinder $a$ a new form of packing, which prevents the egress of air from the cylinder around the piston-rod $b^1$ and through the joint at the end of the said cylinder. This packing consists of a metal ring, $m$, of semicircular form in cross-section, as shown, upon which is placed the ring $n$, of leather or other suitable material.

$m'$ $m'$ are apertures in the semicircular ring $m$, through which the air in the cylinder $a$ has access to the under surface of the ring $n$, and therefore constantly forces the said ring firmly against both the above-named surfaces.

The advantage of the above-described construction of the said machine consists in the fact that a dead-blow is secured, for the reason that there is always a considerable pressure on the upper surface of the piston after the blow is struck, thus avoiding recoil in the working of the machine.

We find, in practice, that it is desirable to provide means whereby the angle through which the tool is turned at each stroke and the consequent feed of the said tool may be accurately regulated and defined according to the nature of the rock to be drilled; and for effecting these objects we provide devices which we will now proceed to describe, and which are shown in Figs. 2 and 3.

The lifting-block $f$, which is made in two halves or parts, $f^1$ $f^2$, is secured to the nut $g$, as above described, by means of the two collars $f^3$ $f^4$, the lower one, $f^3$, being usually made of steel. Both these collars are secured to the block by means of screws, which are made left-handed, in order that the cam in its action upon the block may have a tendency to tighten instead of to loosen them. The upper collar has upon its periphery projecting teeth $f^5$, which, as the block turns, engage successively with the device, Figs. 2 and 3, so arranged in relation to the said toothed collar that only one tooth can pass at each stroke of the piston, and thus any desired degree of rotation may be given to the tool at each stroke, the degree of rotation being determined by the number of teeth upon the collar $f^4$.

The device with which the said teeth engage is constructed as follows—that is to say, upon a plate of metal, $o$, which is bolted to the frame of the machine near the lifting-block $f$, we provide a projecting inclined tongue-piece, $o^1$, which is formed on the said plate $o$, and extends upward in a vertical direction. At the upper part of the said plate we attach a two-armed lever, $p$, which lever works freely on its pivot $p^*$. The long arm $p^1$ of this lever is kept pressed against the upper part of the aforesaid projection $o^1$ by means of a spring, $p^3$, secured at one end to the short arm $p^2$ of the aforesaid lever, and attached by its other end to a pin or stud, $o^2$, projecting from the said plate. The long arm of the said lever is arranged to move between the upper part of the projection $o^1$ and the stop pin or piece $o^3$ on the plate $o$.

The operation is as follows: When the lifting-block $f$ commences to rise, one of the teeth $f^5$ upon the collar $f^4$ engages with the projecting piece $o^1$ on the plate $o$; and as the said block continues its upward movement this tooth, by the reason of the rotation given to the lifting-block by the cams $c$, slides up the inclined surface of the said projecting piece to the top of the latter, and, the lifting-block still being rotated by the cams $c$, the aforesaid tooth in its further upward movement also receives a further lateral movement, and presses back the long arm $p^1$ of the lever $p$ until it strikes the stop $o^3$, as shown by the dotted lines in Fig. 3. When the lifting-block has arrived at its highest position the said tooth is immediately above the space now left between the said long arm of the lever and the back surface of the projecting piece $o^1$; and when the block is released by one of the cams $c$, and descends, this tooth passes through the aforesaid space or opening, and when the block arrives at its lowest point the said tooth is on the other side of the said projecting piece, the rotation of the drill-point and consequent feed of the said drill having been determined by the distance which the toothed collar and the block have rotated. The long arm $p^1$ of the lever $p$, after the passage of the aforesaid projection $f^5$, is then returned to its former position by the spring $p^3$, and the next projection on the said collar is in the same position as that occupied by the preceding one previous to the above-described movements.

In order to vary the angle of rotation to be given to the tool at each stroke we provide interchangeable collars, each having a different number of teeth. The smaller the number of teeth the greater will be the angle between each cut, and consequently the degree of rotation will also be proportionally greater, so that by means of this arrangement we are enabled to give to the tool the exact degree of rotation and feed desired, according to the nature of the rock being drilled.

We find in practice that thirteen teeth are a convenient number when drilling hard rocks, and six when drilling soft rocks.

A toothed wheel upon the drill-shank has been used in connection with devices for effecting the rotary feed of the drill at each stroke, and therefore such a device is not claimed, broadly, in this patent; but so far as we know interchangeable toothed wheels having a different number of teeth for varying the angle of rotation to be given to the drill to suit different kinds of rock have not hitherto been contemplated.

What we claim is—

1. In a machine for drilling rocks and other hard substances, the pawl and the ratchet-wheel $h^2$, in combination with and for controlling the movement of the wheels $h\ h^1$ and nut $g$, substantially as above set forth.

2. The piston trunk or extension $b^2$, adapted to form a space between it and the interior of the cylinder, in combination with a stop-valve, $a^1$, and a cover therefor, having grooves $a^2$ coincident with the valve and the air-receiving space, whereby an additional charge of air is admitted into the cylinder from the space above the valve at each downward stroke of the piston.

3. The means, substantially as herein described, for admitting an additional charge of air into the cylinder at each descending stroke of the piston, in combination with an escape-valve, $k$, attached to the side of the cylinder, near its top, and controlled by a spring adapted to relieve the cylinder at any pressure, according to the power to be used for raising the piston.

4. For the purpose of varying the angle of rotation to be given to the tool at each stroke, and the consequent feed of the tool, the combination, with the lever $p$ and the fixed projecting tongue $o^1$, of interchangeable cogged collars, each having a different number of teeth, whereby the degree of rotation and the feed are adapted to the nature of the rock being drilled.

5. To prevent the egress of air from the cylinder around the piston-rod $b^1$ at the upper cylinder-head, a packing consisting of the hollow convex metal ring $m$, having perforations $m'\ m'$, and the leather ring $n$ seated upon the convex side of said hollow metal ring, whereby the air in the cylinder has access to the concave surface of the ring $n$, and thereby constantly forces it against its seat in the cylinder-head and against the piston-rod.

London, September 6, 1878.

THOMAS BROWN JORDAN.
THOMAS ROWLAND JORDAN.

Witnesses:
CHAS. BERKLEY HARRIS,
  17 *Gracechurch Street, London, E. C.*
JNO. DEAN,
  17 *Gracechurch Street, London, E. C.*